(12) United States Patent
Ma et al.

(10) Patent No.: US 10,986,957 B2
(45) Date of Patent: Apr. 27, 2021

(54) AUTOMATIC COOKING MACHINE

(71) Applicant: SHENZHEN FANLAI TECHNOLOGY CO., LTD., Guangdong (CN)

(72) Inventors: Long Ma, Guangdong (CN); Ze Lin, Guangdong (CN); Zirong Huang, Guangdong (CN)

(73) Assignee: SHENZHEN FANLAI TECHNOLOGY CO., LTD., Shenzhen (CN)

(*) Notice: Subject to any disclaimer, the term of this patent is extended or adjusted under 35 U.S.C. 154(b) by 316 days.

(21) Appl. No.: 16/317,544

(22) PCT Filed: Aug. 28, 2017

(86) PCT No.: PCT/CN2017/099284
§ 371 (c)(1),
(2) Date: Jan. 12, 2019

(87) PCT Pub. No.: WO2018/209839
PCT Pub. Date: Nov. 22, 2018

(65) Prior Publication Data
US 2019/0290059 A1    Sep. 26, 2019

(30) Foreign Application Priority Data

May 19, 2017    (CN) .......................... 201710356677.2

(51) Int. Cl.
*A47J 36/16*    (2006.01)
*A47J 27/00*    (2006.01)
(Continued)

(52) U.S. Cl.
CPC ........... *A47J 36/165* (2013.01); *A47J 27/002* (2013.01); *A47J 27/004* (2013.01); *A47J 36/00* (2013.01); *A47J 36/06* (2013.01)

(58) Field of Classification Search
CPC ........ A47J 27/62; A47J 36/321; A47J 36/165; A47J 27/002; A47J 27/004; A47J 36/00; A47J 36/06
(Continued)

(56) References Cited

U.S. PATENT DOCUMENTS

2016/0278567 A1*    9/2016    Gagnon ................ A47J 36/321

FOREIGN PATENT DOCUMENTS

CN    1494851 A    5/2004
CN    101023846 A    8/2007
(Continued)

OTHER PUBLICATIONS

International Search Report of PCT Patent Application No. PCT/CN2017/099284 dated Nov. 15, 2017.

*Primary Examiner* — Phuong T Nguyen

(57) ABSTRACT

An automatic cooking machine includes a base (11), a cooking pot (12) mounted on the base (11), a pot lid (21), a stirring chamber enclosed by the cooking pot (12) and the pot lid (21), a stirring mechanism (26) rotatably mounted in a rotating cavity and configured to stir a food material, a food material box (42), and a film tearing assembly (51); the stirring mechanism (26) includes a control arm (27), a connecting arm (28), and a stirring blade (29) disposed between the control arm (27) and the connecting arm (28); in the stirring chamber, the stirring mechanism (26) rotates around a rotating axis; the food material box (42) includes a box body (42) and a sealing film (44) for sealing; and the film tearing assembly (51) is configured to tear the sealing film (44) of the food material box (42) during automatic feeding.

15 Claims, 8 Drawing Sheets

(51) Int. Cl.
*A47J 36/06* (2006.01)
*A47J 36/00* (2006.01)

(58) Field of Classification Search
USPC ......... 99/280, 281, 325, 330, 331, 341, 342, 99/348
See application file for complete search history.

(56) References Cited

FOREIGN PATENT DOCUMENTS

| | | |
|---|---|---|
| CN | 204158228 U | 2/2015 |
| CN | 105496180 A | 4/2016 |
| CN | 105496218 A | 4/2016 |
| CN | 106108728 A | 11/2016 |
| CN | 106428854 A | 2/2017 |
| CN | 206006864 U | 3/2017 |
| CN | 107048981 A | 8/2017 |

* cited by examiner

AUTOMATIC COOKING MACHINE

TECHNICAL FIELD

The present invention belongs to the technical field of cooking appliances, and particularly relates to an automatic cooking machine.

BACKGROUND

At present, a cooking machine is usually adopted in the catering industry in place of manual stir-frying. At the bottom of a pot of a cooking machine, a spatula mechanism is provided. The spatula mechanism is driven by a motor to rotate along the bottom of the pot. A conventional spatula mechanism includes a spatula body and a swing rod fixedly connected to the spatula body; and the swing rod and the spatula body are integrated into a whole. The spatula mechanism with such a structure is inconvenient to operate; as the swing rod has a large swing angle, during stir frying, dish is lifted to the air along with the spatula body, and a part of the dish is easily taken out of the pot with the spatula body, which causes a waste. For an existing cooking machine, a spatula of a stirring mechanism is generally perpendicular to a horizontal plane, so that the stir frying is not in place easily, and the dish is heated unevenly; as a result, phenomena such as burning are caused and the taste and the quality of the dish are affected; and moreover, it is inconvenient to clean the cooking machine after cooking.

Technical Problem

An embodiment of the present invention provides an automatic cooking machine to solve the technical problems with a conventional cooking device that it is inconvenient to control a material box to feed a food material and that the user experience is poor.

SUMMARY

The present invention is implemented as follows: an automatic cooking machine includes a base, a cooking pot mounted on the base and configured to load a food material, a pot lid hinged to the base and covering the cooking pot, a cylindrical stirring chamber enclosed by the cooking pot and the pot lid, a stirring mechanism rotatably mounted in the stirring chamber and configured to stir the food material, a food material box configured to hold the food material, and a film tearing assembly mounted on the pot lid; the cooking pot is provided with a dish chamber configured to store the food material; the stirring mechanism includes a control arm rotatably connected to the pot lid, a connecting arm rotatably connected to the pot lid, and a stirring blade disposed between the control arm and the connecting arm; the control arm and the connecting arm have a same rotating axis; the stirring mechanism rotates around the rotating axis in the stirring chamber; the food material box includes a box body movably connected to the pot lid and configured to place the food material as well as a sealing film disposed at a position between the box body and the pot lid and configured to seal the box body; a hanging port is formed on the sealing film; a feeding port configured to feed the food material is formed on the pot lid; a feeding assembly is mounted at the feeding port; the film tearing assembly includes a film tearing rotating shaft as well as a power device configured to drive the film tearing rotating shaft to rotate; and a hook configured to hook the hanging port to rotate and tear the sealing film and drive the box body to move toward the direction of the feeding port is disposed on the film tearing rotating shaft.

Further, an axis of the stirring chamber is parallel to the rotating axis, and an angle between the rotating axis and a horizontal plane is greater than 0° and is smaller than or equal to 30°.

Further, the angle, parallel to the horizontal plane, of the rotating axis is 0°.

Further, a portion where the stirring blade is connected to the control arm is set as a rounded corner, and a portion where the stirring blade is connected to the connecting arm is set as a rounded corner.

Further, the control arm further includes a control arm body, and a first rotating pin disposed on a side portion of the control arm body; the connecting arm further includes a connecting arm body and a second rotating pin disposed on a side portion of the connecting arm body; the first rotating pin and the second rotating pin have a same rotating axis; one end of the stirring blade is connected to the control arm body, and the other end of the stirring blade is connected to the connecting arm body; and projections of the control arm, the connecting arm, and the stirring blade are in fan-shaped distribution along a direction of the rotating axis.

Further, the pot lid is provided with an accommodation chamber; an inner shell is mounted in the accommodation chamber; the first rotating pin is rotatably connected to the inner shell; the second rotating pin is rotatably connected to the inner shell; and in the stirring chamber, the stirring blade rotates around the rotating axis.

Further, the inner shell is provided with a groove that is arranged in a major arc; the stirring mechanism rotates in the groove; a feeding port is formed on a top of the pot lid; an opening is formed on a top of the inner shell; and the opening is matched with the feeding port and the opening communicates with the feeding port.

Further, the box body includes a plurality of sub-boxes configured to place the food material; the plurality of sub-boxes is independent of each other; and the plurality of sub-boxes is arranged side by side along a direction in which the box body moves.

Further, the film tearing assembly further includes a shaft sleeve part connected to the film tearing rotating shaft, a clutch mechanism connected to the power device, and a first fixing frame connected to the pot lid and configured to fix the shaft sleeve part and the clutch mechanism; and the power device drives the clutch mechanism to rotate forwardly or reversely so that the clutch mechanism is connected to or separated from the shaft sleeve part.

Further, the clutch mechanism includes a clutch rotating shaft pin, a clutch nut in threaded fit with the clutch rotating shaft pin, and a second fixing frame configured to fix the clutch nut; and the second fixing frame is mounted on the first fixing frame.

Further, the stirring blade rotates to the bottom of the cooking pot and may be in contact with a surface of the bottom; the stirring blade may be slid along the surface of the bottom of the cooking pot; the stirring blade forms an included angle with a normal plane at a contact position on the surface of the cooking pot; and the included angle is an acute angle.

Further, a seal ring configured to prevent a liquid from overflowing is disposed between the base and the pot lid; and the seal ring is fixedly mounted at an edge position of a lower end of the pot lid.

Further, the automatic cooking machine further includes a heating device disposed on the base and configured to provide heat for the automatic cooking machine; and the heating device is installed at a position below the cooking pot.

Further, the bottom of the cooking pot is arranged in a minor arc; a position on a side portion of the cooking pot extends outward to form an extension portion of a handle for connection; the handle configured to take the cooking pot is mounted and connected at a free end of the extension portion; and the handle is stretched out of an outer circumference of the base.

Further, the pot lid further includes a hand grip configured to close or open the pot lid and the base; and the hand grip is disposed outside the handle.

Beneficial Effects

According to the cooking machine of the present invention, the stirring chamber enclosed by the cooking pot and the pot lid is of a cylindrical shape, so that a situation that a corner of the cooking pot cannot contact the stirring blade may be prevented, and the utilization rate of the stirring chamber is improved. When the food material is put, the pot lid is opened; since the stirring blade is mounted on the pot lid, the stirring blade moves along with the pot lid and the stirring blade is separated from the cooking pot; as a result, the inconvenience brought by the stirring blade in the dish putting process is prevented, and the dish putting efficiency of the cooking machine is greatly improved. The prepared food material and seasoning may be placed into the food material box, thereby improving the convenience of adding the food material to the automatic cooking machine. The film tearing rotating shaft is driven by the power device to rotate, and the hook on the film tearing rotating shaft hooks the hanging port on the sealing film to rotate and tear the sealing film; and meanwhile, the sealing film drives the box body to move toward the direction of the feeding port to feed the food material, and after the film is torn, the food material may be automatically fed into the cooking pot from the feeding port by means of its own gravity.

DESCRIPTION OF EMBODIMENTS

To make the objectives, technical solutions, and advantages of the present invention clearer and more comprehensible, the following further describes the present invention in detail with reference to the accompanying drawings and embodiments. It should be understood that the specific embodiments described herein are merely used to explain the present invention and are not intended to limit the present invention.

In order to explain the technical solutions of the present invention, the following description will be made by way of specific embodiments.

Embodiment 1

Figure 1:
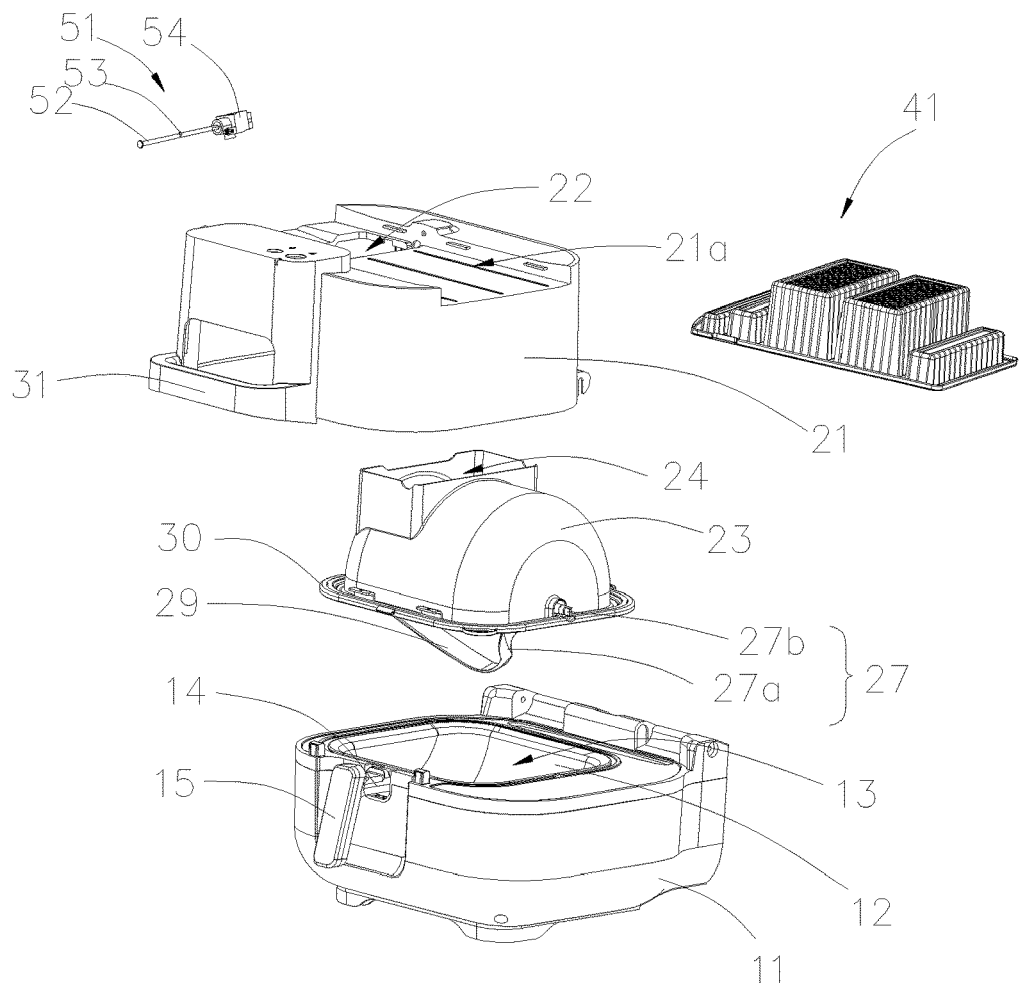
FIG. 1 is an exploded view of an automatic cooking machine provided by the first embodiment of the present invention.
Figure 2:
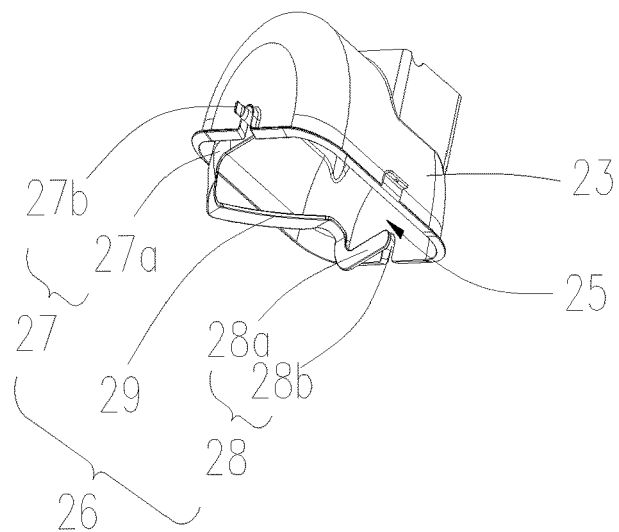
FIG. 2 is an exploded view of a film tearing and feeding mechanism provided by the first embodiment of the present invention.
Figure 3:
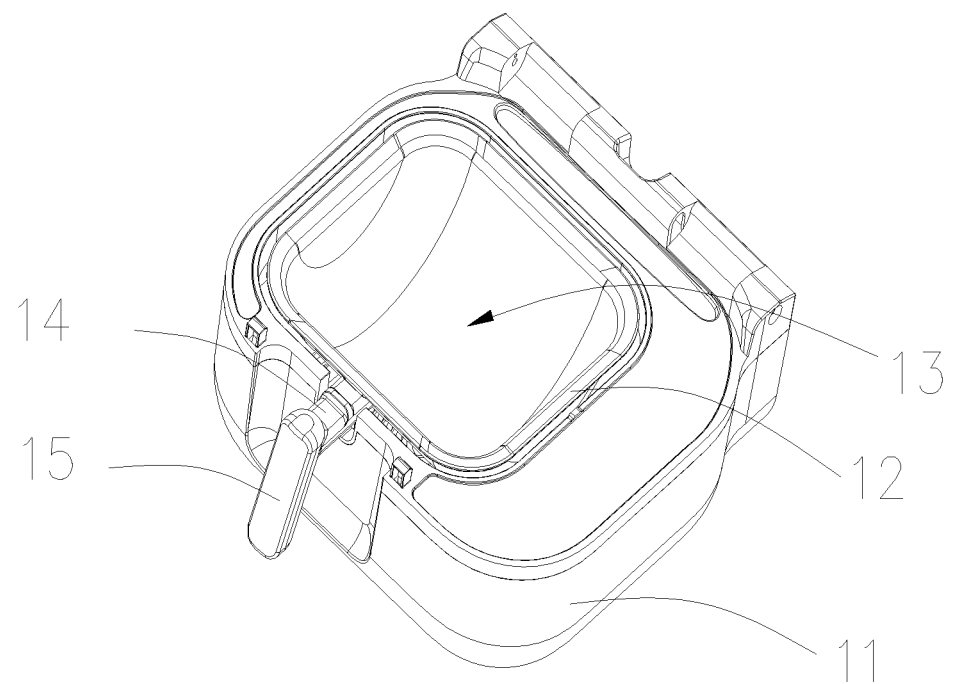
FIG. 3 is a stereoscopic view of an inner shell and a stirring mechanism of a cooking machine provided by the first embodiment of the present invention.
Figure 4:
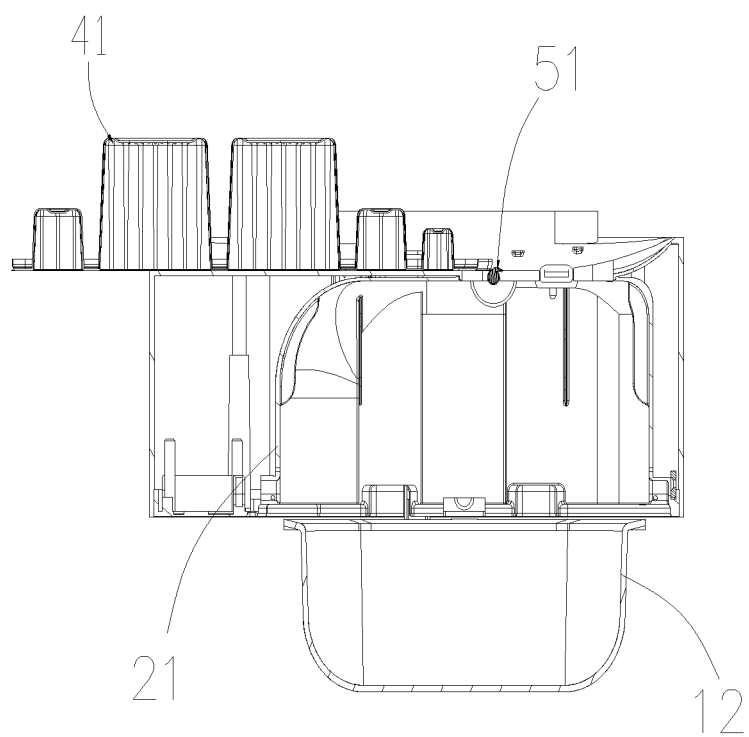
FIG. 4 is a structural schematic view of a food material box, a film tearing assembly, and a cooking pot provided by the first embodiment of the present invention.
Figure 5:
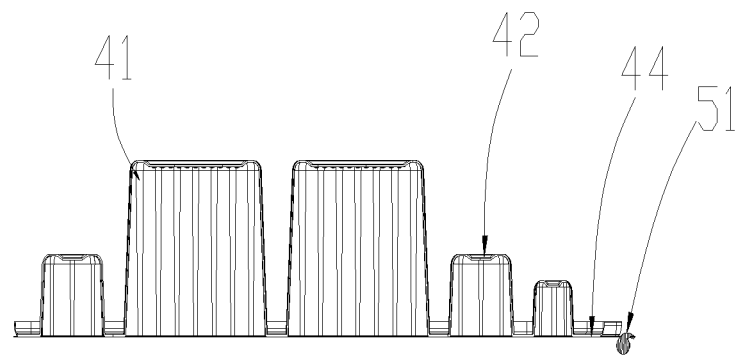
FIG. 5 is a front view showing a cooperation between a food material box and a film tearing rotating shaft provided by the first embodiment of the present invention.
Figure 6:
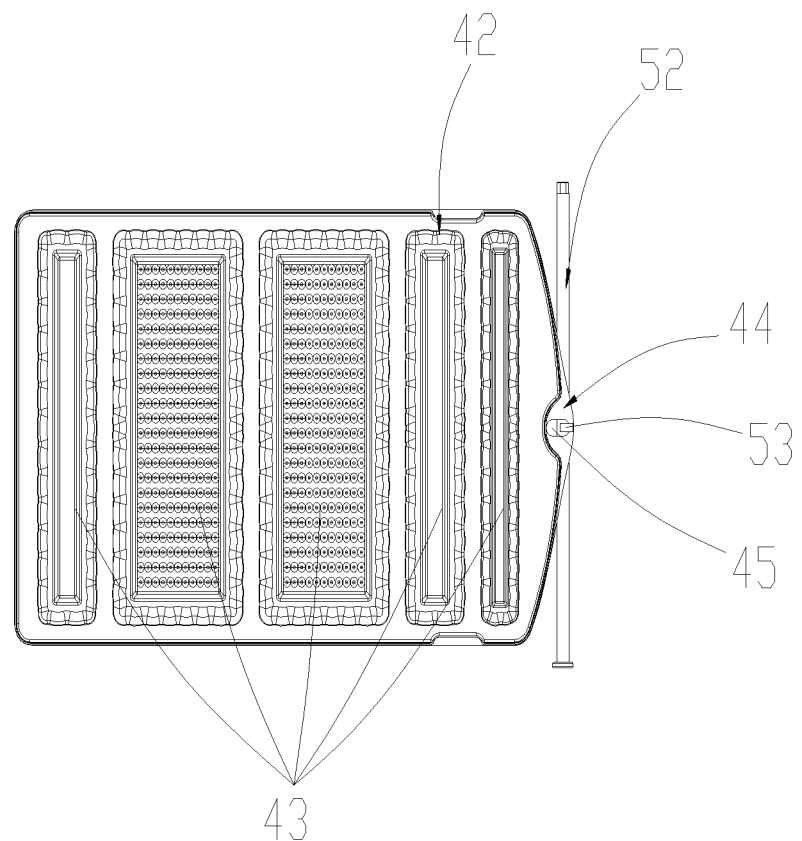
FIG. 6 is a top view showing a cooperation between a food material box and a film tearing rotating shaft provided by the first embodiment of the present invention.
Figure 7:
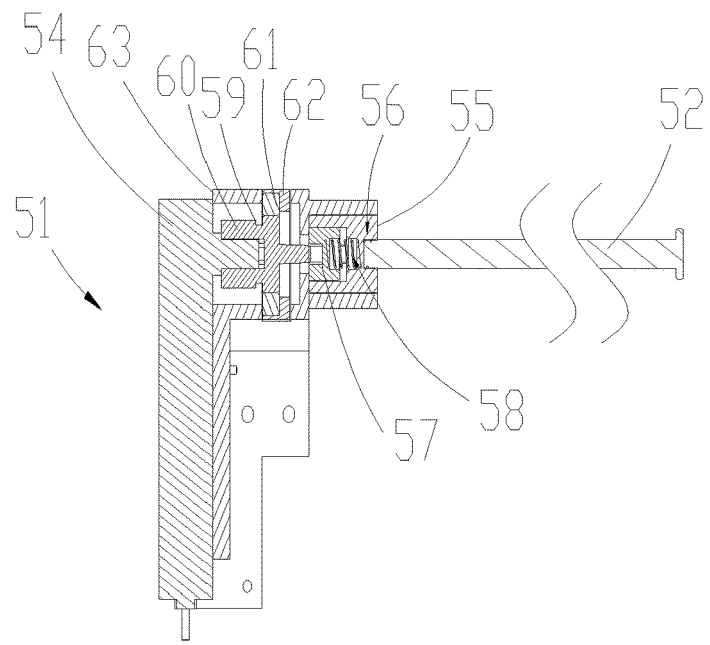
FIG. 7 is a cross-sectional view of a film tearing assembly provided by the first embodiment of the present invention.
Figure 8:
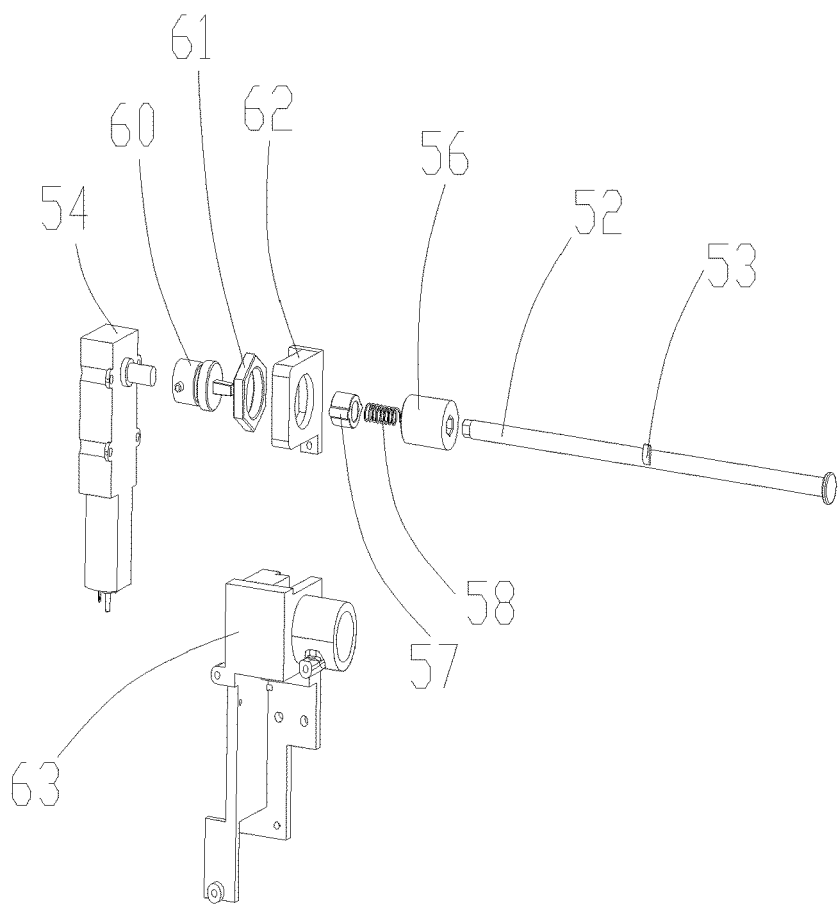
FIG. 8 is an exploded view of a film tearing assembly provided by the first embodiment of the present invention.
Figure 9:
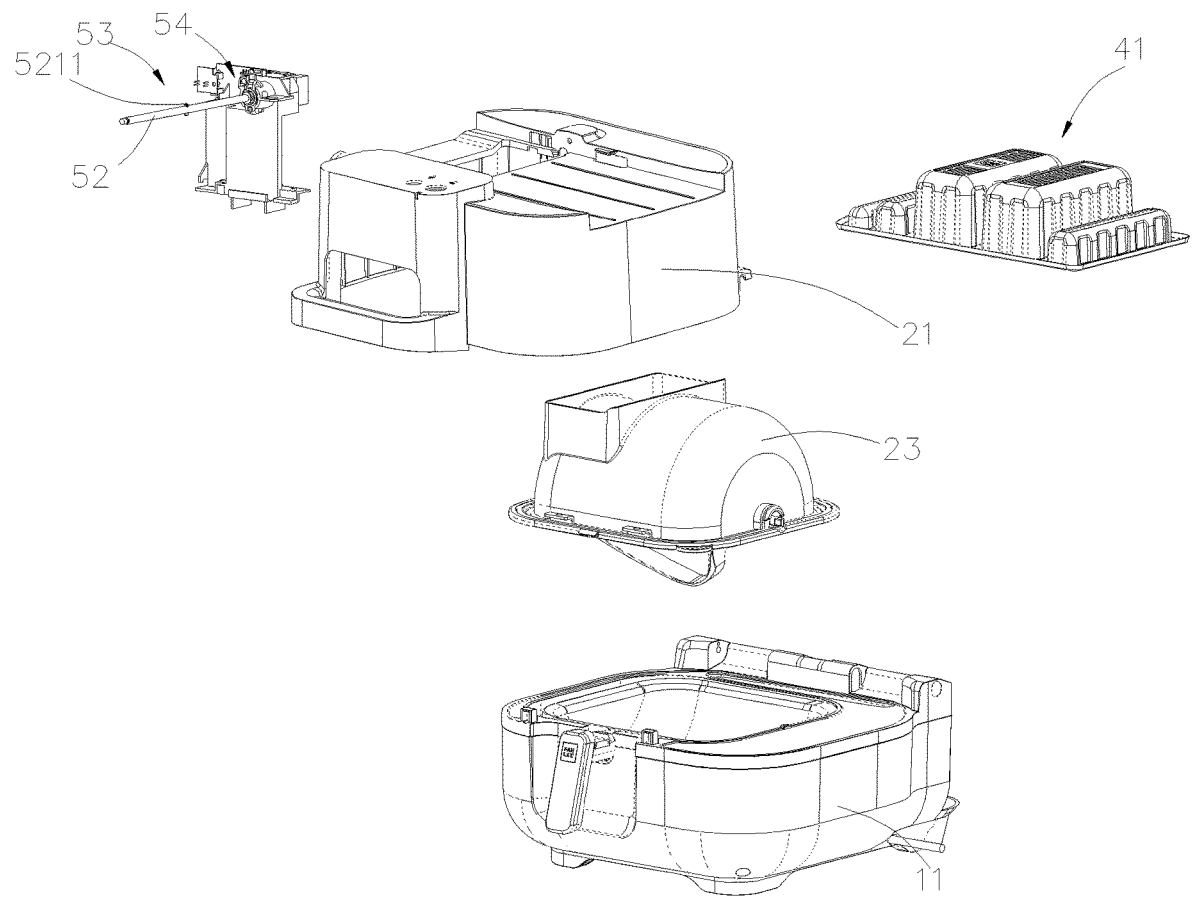
FIG. 9 is an exploded view of an automatic cooking machine provided by the second embodiment of the present invention.
Figure 10:
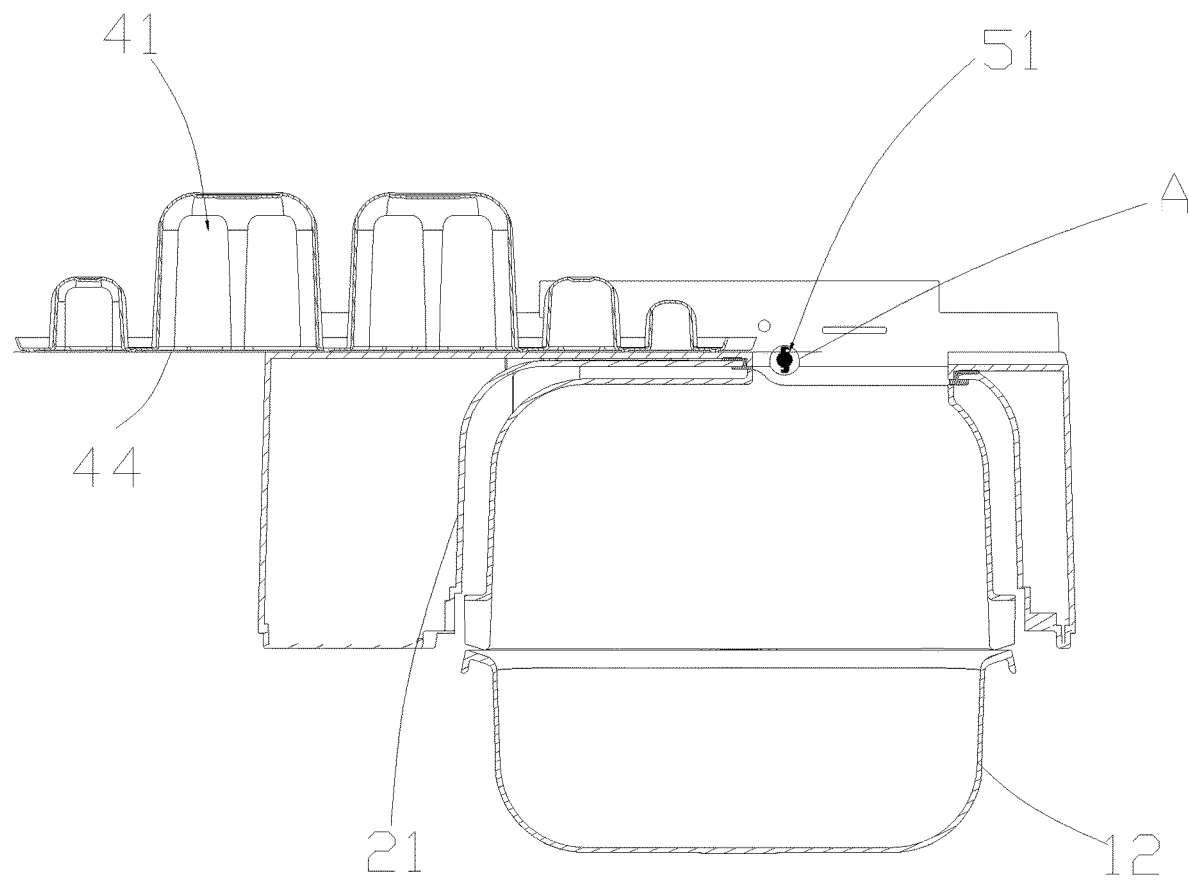
FIG. 10 is a structural schematic view of a food material box, a film tearing assembly, and a cooking pot provided by the second embodiment of the present invention.
Figure 11:
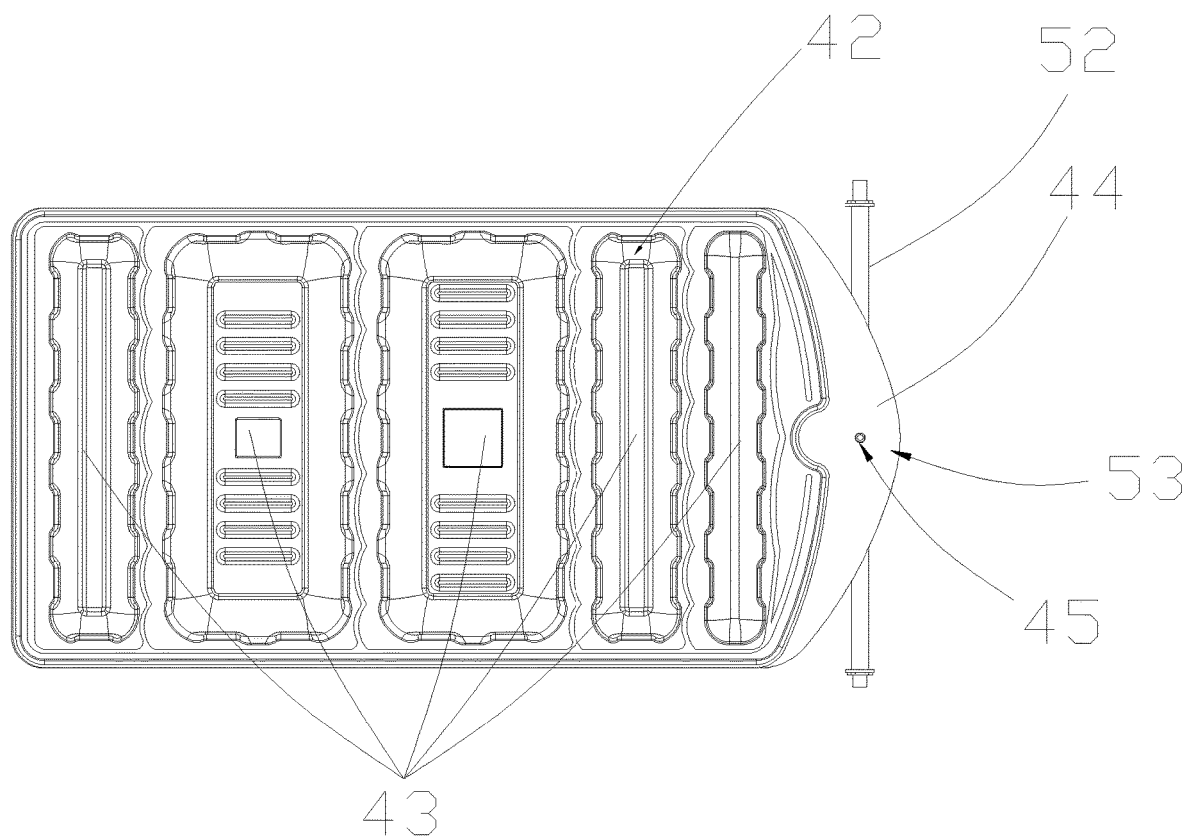
FIG. 11 is a top view showing a cooperation between a food material box and a film tearing rotating shaft provided by the second embodiment of the present invention.

Referring to FIG. 1 to FIG. 3, an embodiment of the present invention provides an automatic cooking machine, which includes a base 11, a cooking pot 12 mounted on the base 11 and configured to load a food material, a pot lid 21 hinged to the base 11 and covering the cooking pot 12, a stirring mechanism 26 rotatably connected to the pot lid 21 and configured to stir the food material, a food material box 42, and a film tearing assembly 51 mounted on the pot lid; the cooking pot 12 is provided with a dish chamber 13 configured to store the food material; the stirring mechanism 26 includes a control arm 27 rotatably connected to the pot lid 21, a connecting arm 28 rotatably connected to the pot lid 21, and a stirring blade 29 disposed between the control arm 27 and the connecting arm 28; the control arm 27 and the connecting arm 28 have the same rotating axis; the stirring mechanism 26 rotates around the rotating axis; the stirring blade 29 rotates around the rotating axis, and stirs the food material in the dish chamber 13; the food material box 41 includes a box body 42 movably connected to the pot lid 21 and configured to place the food material as well as a sealing film 44 disposed at a position between the box body 42 and the pot lid 21 and configured to seal the box body 42; a hanging port 45 is formed on the sealing film 44; the film tearing assembly 51 includes a film tearing rotating shaft 52 as well as a power device 54 configured to drive the film tearing rotating shaft 52 to rotate; and a hook 53 configured to hook the hanging port 45 to rotate and tear the sealing film 44 and drive the box body 42 to move toward the direction of the feeding port is disposed on the film tearing rotating shaft 52.

A stirring chamber enclosed by the cooking pot and the pot lid is of a cylindrical shape, so that a corner of the cooking pot cannot contact the stirring blade may be prevented, and the utilization rate of the stirring chamber is improved. When the food material is put, the pot lid 21 is opened; since the stirring blade 29 is mounted on the pot lid 21, the stirring blade 29 moves along with the pot lid 21 and the stirring blade 29 is separated from the cooking pot 12; as a result, the inconvenience brought by the stirring blade 29 in the dish putting process is prevented, and the dish putting efficiency of the cooking machine is greatly improved. The prepared food material and seasoning may be placed into the food material box 42, thereby improving the convenience of adding the food material to the automatic cooking machine. The film tearing rotating shaft 52 is driven by the power device 54 to rotate, and the hook 53 on the film tearing rotating shaft 52 hooks the hanging port 45 on the sealing film 44 to rotate and tear the sealing film 44; and meanwhile, the sealing film 44 drives the box body 42 to move toward the direction of the feeding port to feed the food material, and after the film is torn, the food material may be automatically fed into the cooking pot from the feeding port by means of its own gravity. The film tearing assembly 51 is simple in structure, and the sealing film 44 is torn through the rotation of the film tearing rotating shaft 52, so that the food material box is controlled conveniently to feed the food material; and moreover, as the tearing rotating shaft 52 drives the food material box 41 to move toward the feeding port during the rotating process, all food materials are prevented from being fed at a time, and thus the taste of dish is improved, and the user experience is good.

Further, an axis of the stirring chamber is parallel to the rotating axis, and an angle between the rotating axis and a horizontal plane ranges from 0° to 30°.

Further, the stirring blade 29 rotates to the bottom of the cooking pot 12 and may be in contact with a surface of the bottom; the stirring blade 29 may be slid along the surface of the bottom of the cooking pot 12; the stirring blade 29 forms an included angle with a normal plane at a contact position on the surface of the cooking pot 12; and the included angle is an acute angle.

The stirring blade 29 of the cooking machine forms the acute angle with the normal plane at the contact position on the surface of the cooking pot 12, so that the food material may roll along the surface of the stirring blade 29 in the food material stirring process; the food material rolling into the cooking pot 12 from the surface of the stirring blade 29 may continuously roll over in a food material stirrer under the action of an inertia force and the action of continuous stirring of the stirring mechanism 26, so that each side of the food material absorbs the same amount of heat, and a phenomenon that the food material is not cooked thoroughly or is burnt is prevented; the stirring blade 29 may rotate to contact the surface of the cooking pot 12, so it is assured that all food materials on a surface of a container may be stirred by the stirring blade 29 during a re-stirring process, and thus the stirring effect of the stirring blade 29 is improved, and a situation in which some food materials are located in a gap between the stirring blade 29 and the surface of the cooking pot 12 and cannot be stirred to result in that the food materials are burnt is prevented.

Further, referring to FIG. 3, the control arm 27 includes a control arm body 27a, and a first rotating pin 27b disposed on a side portion of the control arm body 27a; the connecting arm 28 includes a connecting arm body 28a and a second rotating pin 28b disposed on a side portion of the connecting arm body 28a; the first rotating pin 27b and the second rotating pin 28b have a same rotating axis; one end of the stirring blade 29 is connected to the control arm body 27a, and the other end of the stirring blade 29 is connected to the connecting arm body 28a; and projections of the control arm 27, the connecting arm 28, and the stirring blade 29 are in fan-shaped distribution along a direction of the rotating axis.

When the stirring mechanism 26 rotates along a direction, since the projections of the control arm 27, the connecting arm 28, and the stirring blade 29 are in the fan-shaped distribution along the direction of the rotating axis, in the stirring process of the stirring blade 29, one end connected to the control arm body 27a, of the stirring blade 29 first contacts the surface of the cooking pot 12, and thereafter one end connected to the connecting arm body 28a, of the stirring blade 29 contacts the surface of the cooking pot 12, so that the food material not only may roll along a direction to which the stirring blade 29 is inclined, but also may roll along a direction to which the stirring blade 29 extends, the food material may be stirred more fully and the food material is heated more uniformly.

Further, a portion where the stirring blade 29 is connected to the control arm 27 is set as a rounded corner, and a portion where the stirring blade 29 is connected to the connecting arm 28 is set as a rounded corner.

After the cooking is completed, the cooking pot 12 and the stirring mechanism 26 of the cooking machine need to be cleaned; the portion where the stirring blade 29 is connected to the control arm 27 is set as the rounded corner, and the portion where the stirring blade 29 is connected to the connecting arm 28 is set as the rounded corner, so that openings 24 at a junction of the stirring blade 29 and the control arm 27 and a junction of the stirring blade 29 and the connecting arm 28 may be larger, the convenience of cleaning of the stirring blade 29 is improved, and the maintenance of the cooking machine is convenient, and thus the service life of the cooking machine is prolonged.

Further, the pot lid 21 is provided with an accommodation chamber; an inner shell 23 is mounted in the accommodation chamber; the first rotating pin 27b is rotatably connected to the inner shell 23; the second rotating pin 28b is rotatably connected to the inner shell 23; and in the stirring chamber, the stirring blade 29 rotates around the rotating axis.

Further, the inner shell 23 is provided with a groove 25 that is arranged in a major arc; the stirring mechanism 26 rotates in the groove 25; a feeding port 22 is formed on a top of the pot lid 21; an opening 24 is formed on a top of the inner shell 23; and the opening 24 is matched with the feeding port 22 and the opening 24 communicates with the feeding port 22.

The food material and the seasoning may be added to the cooking machine from the feeding port 22; moreover, the feeding port 22 is formed at the top, so that the lateral sealing property may be increased, and a soup is prevented from splashing from a side direction. With the inner shell 23 arranged in the major arc, it is assured that a sufficient distance is kept between the feeding port 22 and the stirring blade 29, the soup is prevented from splashing from the feeding port 22 and scalding an operator of the cooking machine, and the safety of the cooking machine is enhanced. Through the inner shell 23 with the pot lid 21, the heat loss may further be prevented, the frying speed of the food material is accelerated, and the efficiency of cooking the dish by the cooking machine is improved.

Further, a seal ring 30 configured to prevent a liquid from overflowing is disposed between the base 11 and the pot lid 21; and the seal ring 30 is fixedly mounted at an edge position of a lower end of the pot lid 21.

With the seal ring 30 disposed between the base 11 and the pot lid 21, the sealing property at a junction of the base 11 and the pot lid 21 may be strengthened, and when the cooking machine is used for cooking, the soup may be prevented from overflowing from the junction of the base 11 and the pot lid 21 to increase the cleaning workload of the cooking machine.

Further, the automatic cooking machine further includes a heating device disposed on the base 11 and configured to provide heat for the cooking machine; and the heating device is installed at a position below the cooking pot 12. Based on this structure, with the addition of the heating device, the food material may be heated by the heating device during the stirring process, so that the shape of the food material is changed and nutritional components of a food are more easily absorbed by human body.

Further, the bottom of the cooking pot 12 is arranged in a minor arc; a position on a side portion of the cooking pot 12 extends outward to form an extension portion 14 of a handle 15 for connection; the handle 15 configured to take the cooking pot 12 is mounted and connected at a free end of the extension portion 14; and the handle 15 is stretched out of an outer circumference of the base 11.

When the heating device located below the cooking pot 12 heats, as the bottom of the cooking pot 12 is arranged in the minor arc, the heat is uniformly distributed at the bottom of the cooking pot 12, and a situation that the heat is excessively concentrated at a certain position to burn the food material easily and the food material at other positions still is not completely cooked due to insufficient heat is prevented. Moreover, the bottom of the cooking pot 12 is arranged in the minor arc, which is also beneficial to taking out a fried food material from the cooking pot 12; and by disposing the handle 15 out of the outer circumference of the base 11, the heating device may be prevented from heating the handle 15 to scald a hand in the heating process.

Further, the pot lid 21 further includes a hand grip 31 configured to close or open the pot lid 21 and the base 11; and the hand grip 31 is disposed outside the handle 15. Based on this structure, a user may open the pot lid by the hand grip. The hand grip has the characteristic of being held conveniently, so the user applies an external force conveniently to open the pot lid, and thus the efficiency of opening the pot lid is improved. In addition, in the process of heating the food material by the heating device, there is a problem that the temperature of the pot lid is too high. With the hand grip, the user may be prevented from directly touching the pot lid, thereby being beneficial to preventing the user from being scalded.

Further, a corner of the pot lid 21 and a corner of the base 11 in the cooking machine are rounded corners. Each corner of the cooking machine is set as the rounded corner, so that each corner of the cooking machine has a good buffer surface, and thus an operator may be prevented from being injured or scratched during the dish putting process, and the safety performance of the cooking machine is improved.

Further, in order to facilitate a withdrawal operation of the food material box 41 after the feeding is completed, the film tearing assembly 51 further includes a shaft sleeve part 55 connected to the film tearing rotating shaft 52, a clutch mechanism 59 connected to the power device 54, and a first fixing frame 63 connected to the pot lid 21 and configured to fix the shaft sleeve part 55 and the clutch mechanism 59; and the power device 54 drives the clutch mechanism 59 to rotate forwardly or reversely so that the clutch mechanism 59 is connected to or separated from the shaft sleeve part 55.

Further, the clutch mechanism 59 includes a clutch rotating shaft pin 60, a clutch nut 61 in threaded fit with the clutch rotating shaft pin 60, and a second fixing frame 62 configured to fix the clutch nut 61; and the second fixing frame 62 is mounted on the first fixing frame 63. The clutch nut 61 is a hexagonal nut. Specifically, the power unit 54 in this embodiment is set as a deceleration motor. The deceleration motor is fixed on the first fixing frame 63, so it may be understood that the first fixing frame 63 may also be expressed as a motor assembly fixing frame. A shaft of the deceleration motor is connected into the clutch rotating shaft pin 60 to drive the clutch rotating shaft pin 60 to rotate forwardly or reversely; the clutch hexagonal nut is fixed on the second fixing frame 62, and the second fixing frame 62 is fixed on the first fixing frame 63; and an outer ring of the clutch rotating shaft pin 60 is provided with an external screw thread, and is matched with the hexagonal nut with an internal screw thread.

Further, the shaft sleeve part 55 includes an inner shaft sleeve 56 configured to fix the film tearing rotating shaft 52 and a movable shaft sleeve 57 assembled in the inner shaft sleeve 56 and configured to be connected to or separated from the clutch rotating shaft pin 60. A spring 58 is disposed between the inner shaft sleeve 56 and the movable shaft sleeve 57. It may be understood that the movable shaft sleeve 57 and the spring 58 are assembled in the inner shaft sleeve 56 together; the inner shaft sleeve 56 is connected to the film tearing rotating shaft 52, and the inner shaft sleeve 56 is fixed on the first fixing frame 63.

Further, through the designed clutch mechanism 59, and through the forward and reverse rotation of the deceleration motor, the connection and the separation between the deceleration motor and the film tearing rotating shaft 52 are implemented. After the feeding is completed, the motor rotates reversely, and the film tearing rotating shaft 52 is separated from the clutch rotating shaft pin 60. A heat sealing film wound on the film tearing rotating shaft 52 may be manually pulled out to complete the withdrawal operation of the food material box 41. That is, when the deceleration motor rotates forwardly, the clutch rotating shaft pin 60 is driven to rotate forwardly, the clutch rotating shaft pin 60 and the hexagonal nut move forward relative to the fixing frame under the acting force of thread fit, the movable shaft sleeve 57 is connected, and then the film tearing rotating shaft 52 is driven to rotate; and when the deceleration motor rotates reversely, the clutch rotating shaft pin 60 is driven to rotate reversely, the clutch rotating shaft pin 60 moves backward relative to the second fixing frame 62 to separate from the movable shaft sleeve 57, and the film tearing rotating shaft 52 may rotate freely in forward and reverse directions.

Preferably, the box body 42 includes a plurality of sub-boxes 43 configured to place the food material; the plurality of sub-boxes 43 is independent of each other; the plurality of sub-boxes 43 is arranged side by side along a direction in which the box body 42 moves, thereby implementing segmented packaging of the food material; and by tearing the sealing film, the food material may be fallen out of the sub-boxes 43 to the cooking pot 12 to implement segmented feeding. In addition, each of the sub-boxes 43 may be configured to place different food materials; the box body 42 is sealed by the heat sealing film; and the hanging port 45 is formed at a front end of the sealing film 44.

Further, an infrared sensing module (not shown in the figure) configured to trigger and position the food material box 41 is disposed on the pot lid 21; and the infrared sensing module includes an infrared emitting module and an infrared receiving module. Specifically, the power device 54 drives the film tearing rotating shaft 52 to rotate; the hook 53 of the film tearing rotating shaft 52 hooks the food material box 41; and then infrared triggering and positioning of the infrared sensing module are performed. It is noted that when the hook 53 of the film tearing rotating shaft 52 hooks the food material box 41, a manual or automatic manner may be selected according to an actual need.

Further, in order to facilitate the feeding of the food material box 41, the deceleration motor is mounted on a side edge of the feeding port 22 of the pot lid 21, and the film tearing rotating shaft 52 is connected to the deceleration motor. In addition, the film tearing rotating shaft 52 is mounted on the feeding port 22 of the pot lid 21. When the deceleration motor drives the film tearing rotating shaft 52 to rotate, the sealing film 44 on the food material box 41 is torn and is wound on the film tearing rotating shaft 52, and the food material in the food material box 41 is automatically fed into the cooking pot from the feeding port. Preferably, in order to conveniently control the film tearing rotating shaft 52 to rotate to tear the sealing film 44, an output torque of the deceleration motor ranges from 2 kgf·cm to 14 kgf·cm.

Further, a guide groove 21a in sliding fit with the food material box 41 is formed on the pot lid 21, and the feeding port 22 is formed at a tail end of the guide groove 21a. Specifically, the infrared emitting module and the infrared receiving module are mounted at two sides of the guide groove 21a of the pot lid 21, and the food material box 41 is triggered and positioned in an infrared manner. After startup, the film tearing rotating shaft 52 is rotated by the motor. After the food material box 41 is hooked, the food material box 41 is pre-tensioned until a first sub-box 43 of the food material box 41 blocks infrared rays so as to determine that the food material box 41 is in place. By triggering and positioning the food material box 41 via the infrared emitting module and the infrared receiving module mounted on the two sides of the guide groove 21a, the automatic segmented feeding of the food material is implemented.

In addition, the hook 53 is preferably disposed on a middle portion of the film tearing rotating shaft 52 to hook the hanging port 45 of the food material box 41, and drive the box body 42 to move forward. Certainly, the hanging port 45 of the food material box 41 corresponds to the position of the hook 53.

When in use, the food material box 41 is placed in the guide groove 21a of the pot lid 21; when the cooking device is started up, the motor of the film tearing assembly 51 drives the film tearing rotating shaft 52 to rotate, and the hook 53 is placed at the middle of the film tearing rotating shaft 52 to hook the food material box 41 until the infrared module determines that the food material box 41 is in place; after a cooking command is started, the film tearing rotating shaft 52 rotates to tear the sealing film 44 below the food material box 41 and wind the film on the shaft; at the same time, the box body 42 is driven to move in the direction toward the opening 24 and the feeding port 22 along the guide groove 21a, so that the food material is automatically fed into the cooking pot from the feeding port under its own gravity.

When the feeding is completed, the deceleration motor rotates reversely first, the deceleration motor is separated from the film tearing rotating shaft 52, and the film tearing rotating shaft 52 may rotate freely. The withdrawal operation of the food material box 41 may be completed by manually pulling out the heat sealing film wound on the film tearing rotating shaft 52 and the box body 42.

It is noted that an existing conventional technique may be respectively adopted by the sealing film 44, the infrared sensing module, the deceleration motor, the shaft sleeve part 55, and the clutch rotating shaft pin 60 in this embodiment of the present invention to implement corresponding functions, and details will not be repeated herein.

According to the automatic cooking machine provided by the present invention, the automatic film tearing and feeding may be implemented for the well prepared food material box 41; and all food materials are prevented from being fed at a time, and thus the taste of the dish is improved, and the user experience is good. It is noted that the automatic cooking machine provided by the present invention is configured to automatically feed the food material, and may be used in a cooking machine, a stirrer and a food processor, but is not limited thereto.

Embodiment 2

Figure 12:
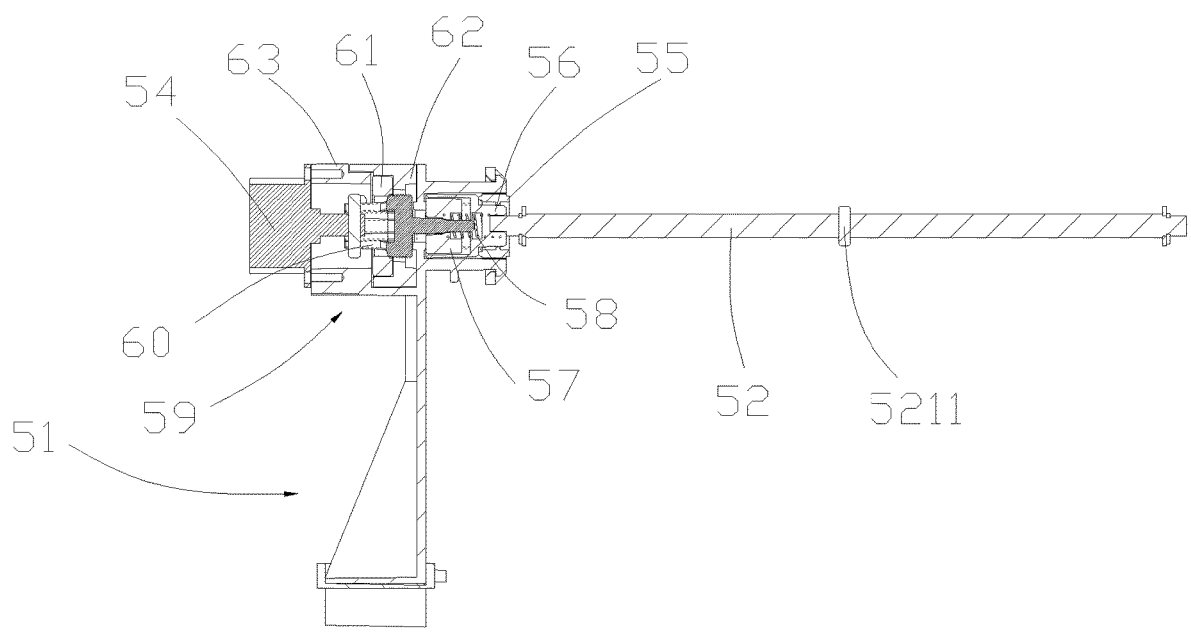
FIG. 12 is a cross-sectional view of a film tearing assembly provided by the second embodiment of the present invention.
Figure 13:
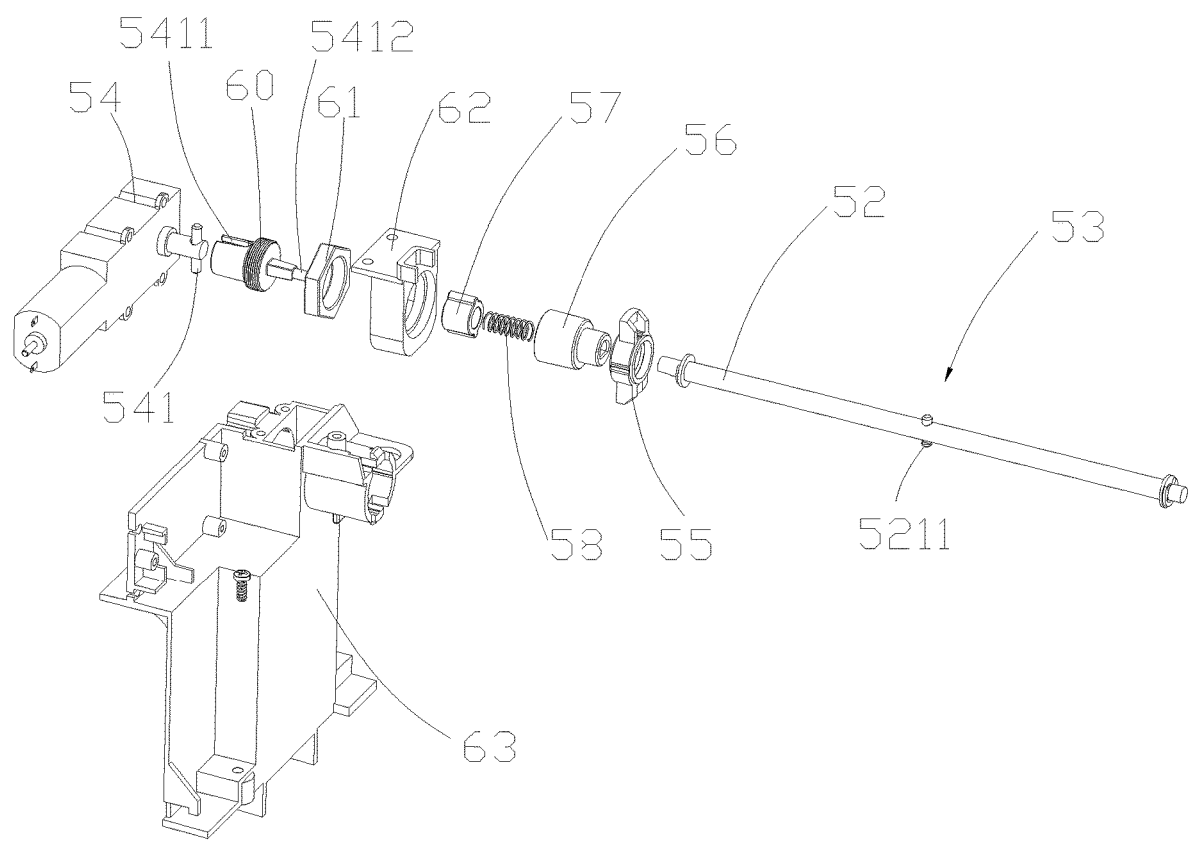
FIG. 13 is an exploded view of a film tearing assembly provided by the second embodiment of the present invention.
Figure 14:
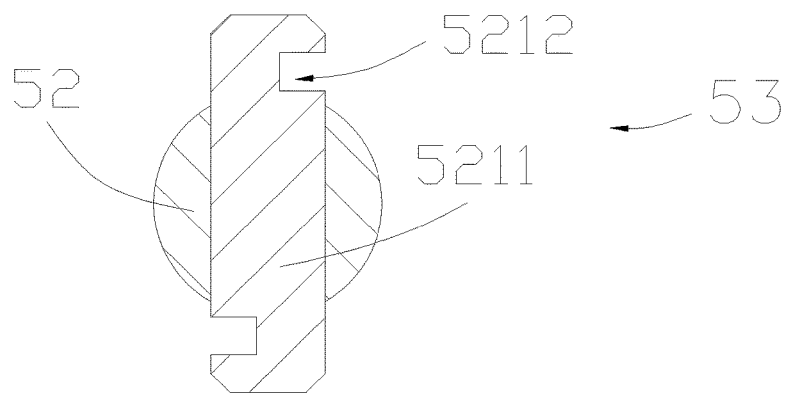
FIG. 14 is an enlarged schematic view of A in FIG. 10.

The only difference of another embodiment provided by the present invention from the first embodiment lies in: referring to FIG. 9 to FIG. 14, preferably, referring to FIG. 12 and FIG. 14, a pin 541 is cooperatively provided on an output shaft of a power device 54. The other end of the pin 541 is connected to a clutch mechanism 59 to transmit a rotational power of the power device 54 to the clutch mechanism 59. With the pin 541, the rotational power is transmitted to the clutch mechanism 59 more smoothly; and meanwhile, a sliding friction resistance with the clutch mechanism 59 is greatly reduced. It is to be noted that a transmission manner adopted in the prior art is usually a flat-position manner and has the defects of large friction and easy blockage.

Preferably, one end, matched with the output shaft of the power device 54, of the clutch rotating shaft pin 60 is provided with a notch 5411 that is matched with the pin 541 one another; and a guide cylinder 5412 is further disposed at the other end of the clutch rotating shaft pin 60. Preferably, a diameter of the guide cylinder 5412 is 2-4 mm, and the diameter of the guide cylinder 5412 may be any value within 2-4 mm. For example, the diameter of the guide cylinder 5412 may be 2 mm, 3 mm or 4 mm, and preferably is 3 mm. Specifically, referring to FIG. 13, the hook 53 includes a penetrating rod 5211 that is disposed on the film tearing rotating shaft 52 in a penetration manner. A hanging groove 5212 is formed on an end portion of the penetrating rod 5211.

The above embodiments are only used to illustrate the technical solutions of the present invention, and are not intended to limit the technical solutions; although the present invention has been described in detail with reference to the foregoing embodiments, those of ordinary skills in the art should understand that they may still modify the technical solutions recorded in each aforementioned embodiment, or perform equivalent substitutions on some of the technical features therein; and such modifications or substitutions do not make the essence of the corresponding technical solution depart from the spirit and scope of the technical solution of each embodiment of the present invention, and should be included in the scope of protection of the present invention.

What is claimed is:

1. An automatic cooking machine, comprising a base, a cooking pot mounted on the base and configured to load a food material, a pot lid hinged to the base and covering the cooking pot, a cylindrical stirring chamber enclosed by the cooking pot and the pot lid, a stirring mechanism rotatably mounted in the stirring chamber and configured to stir the food material, a food material box configured to hold the food material, and a film tearing assembly mounted on the pot lid, wherein the cooking pot is provided with a dish chamber configured to store the food material; the stirring mechanism comprises a control arm rotatably connected to the pot lid, a connecting arm rotatably connected to the pot lid, and a stirring blade disposed between the control arm and the connecting arm; the control arm and the connecting arm have a same rotating axis; the stirring mechanism rotates around the rotating axis in the stirring chamber; the food material box comprises a box body movably connected to the pot lid and configured to place the food material as well as a sealing film disposed at a position between the box body and the pot lid and configured to seal the box body; a hanging port is formed on the sealing film; a feeding port configured to feed the food material is formed on the pot lid; a feeding assembly is mounted at the feeding port; the film tearing assembly comprises a film tearing rotating shaft as well as a power device configured to drive the film tearing rotating shaft to rotate; and a hook configured to hook the hanging port to rotate and tear the sealing film and drive the box body to move toward the direction of the feeding port is disposed on the film tearing rotating shaft.

2. The automatic cooking machine according to claim 1, wherein an axis of the stirring chamber is parallel to the rotating axis, and an angle between the rotating axis and a horizontal plane is greater than 0° and is smaller than or equal to 30°.

3. The automatic cooking machine according to claim 1, wherein the angle, parallel to the horizontal plane, of the rotating axis is 0°.

4. The automatic cooking machine according to claim 1, wherein a portion where the stirring blade is connected to the control arm is set as a rounded corner, and a portion where the stirring blade is connected to the connecting arm is set as a rounded corner.

5. The automatic cooking machine according to claim 1, wherein the control arm further comprises a control arm body, and a first rotating pin disposed on a side portion of the control arm body; the connecting arm further comprises a connecting arm body and a second rotating pin disposed on a side portion of the connecting arm body; the first rotating pin and the second rotating pin have a same rotating axis; one end of the stirring blade is connected to the control arm body, and the other end of the stirring blade is connected to the connecting arm body; and projections of the control arm, the connecting arm, and the stirring blade are in fan-shaped distribution along a direction of the rotating axis.

6. The automatic cooking machine according to claim 5, wherein the pot lid is provided with an accommodation chamber; an inner shell is mounted in the accommodation chamber; the first rotating pin is rotatably connected to the inner shell; the second rotating pin is rotatably connected to the inner shell; and in the stirring chamber, the stirring blade rotates around the rotating axis.

7. The automatic cooking machine according to claim 6, wherein the inner shell is provided with a groove that is arranged in a major arc; the stirring mechanism rotates in the groove; an opening is formed on a top of the inner shell; and the opening is matched with the feeding port and the opening communicates with the feeding port.

8. The automatic cooking machine according to claim 1, wherein the box body comprises a plurality of sub-boxes configured to place the food material; the plurality of sub-boxes is independent of each other; and the plurality of sub-boxes is arranged side by side along a direction in which the box body moves.

9. The automatic cooking machine according to claim 1, wherein the film tearing assembly further comprises a shaft sleeve part connected to the film tearing rotating shaft, a clutch mechanism connected to the power device, and a first fixing frame connected to the pot lid and configured to fix the shaft sleeve part and the clutch mechanism; and the power device drives the clutch mechanism to rotate forwardly or reversely so that the clutch mechanism is connected to or separated from the shaft sleeve part.

10. The automatic cooking machine according to claim 9, wherein the clutch mechanism comprises a clutch rotating shaft pin, a clutch nut in threaded fit with the clutch rotating shaft pin, and a second fixing frame configured to fix the clutch nut; and the second fixing frame is mounted on the first fixing frame.

11. The automatic cooking machine according to claim 1, wherein the stirring blade rotates to the bottom of the cooking pot and may be in contact with a surface of the bottom; the stirring blade may be slid along the surface of the bottom of the cooking pot; the stirring blade forms an included angle with a normal plane at a contact position on the surface of the cooking pot; and the included angle is an acute angle.

12. The automatic cooking machine according to claim 1, wherein a seal ring configured to prevent a liquid from overflowing is disposed between the base and the pot lid; and the seal ring is fixedly mounted at an edge position of a lower end of the pot lid.

13. The automatic cooking machine according to claim 1, wherein the automatic cooking machine further comprises a heating device disposed on the base and configured to provide heat for the automatic cooking machine; and the heating device is installed at a position below the cooking pot.

14. The automatic cooking machine according to claim 1, wherein the bottom of the cooking pot is arranged in a minor arc; a position on a side portion of the cooking pot extends outward to form an extension portion of a handle for connection; the handle configured to take the cooking pot is mounted and connected at a free end of the extension portion; and the handle is stretched out of an outer circumference of the base.

15. The automatic cooking machine according to claim 14, wherein the pot lid further comprises a hand grip configured to close or open the pot lid and the base; and the hand grip is disposed outside the handle.

* * * * *